Nov. 24, 1936.                M. B. ACOSTA                2,061,553
                        FLUSHING DEVICE FOR DRAINS
                          Filed July 29, 1935
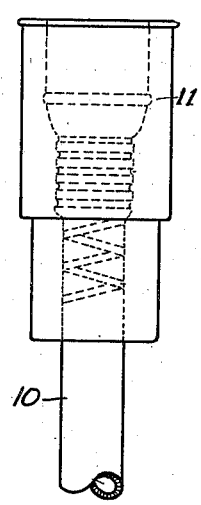
FIG. 4
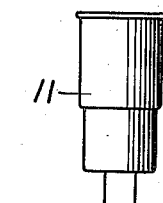
FIG. 1
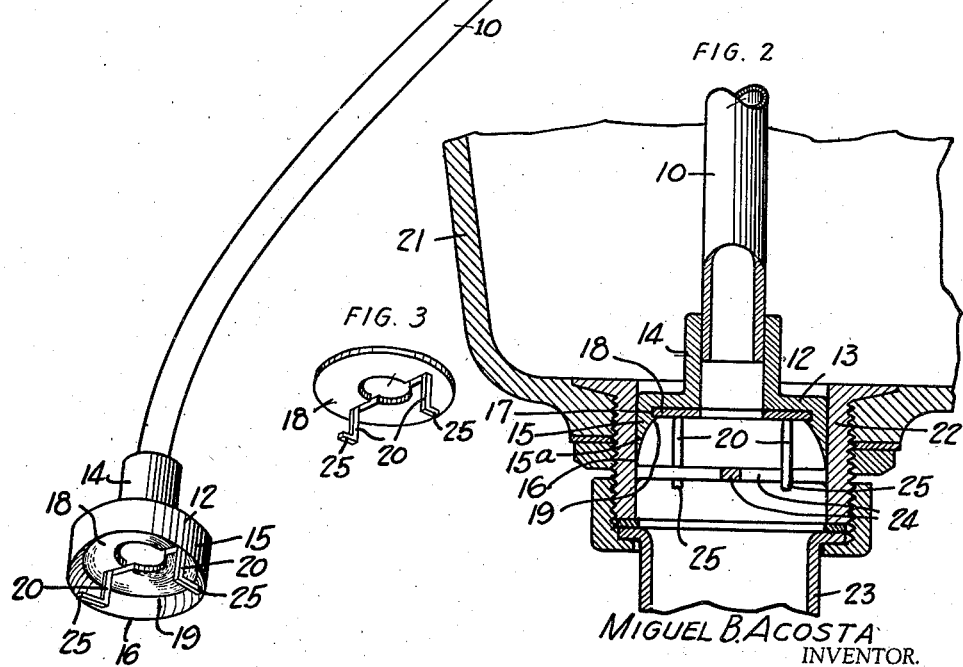
MIGUEL B. ACOSTA
INVENTOR.
BY Munn, Anderson & Liddy
ATTORNEYS Patented Nov. 24, 1936

2,061,553

UNITED STATES PATENT OFFICE 2,061,553

FLUSHING DEVICE FOR DRAINS

Miguel B. Acosta, Los Angeles, Calif.

Application July 29, 1935, Serial No. 33,771

2 Claims. (Cl. 285—44)

This invention relates to and has for an object the provision of a device adapted to be associated with the drain of a sink, tub or other receptacle in a manner to enable such drain when clogged or restricted by foreign substances to be readily cleared by flushing with a jet of water from a faucet at the receptacle or other convenient source of water supply.

Another object of the invention is to provide a flushing device structurally characterized by a flexible plug adapted to be inserted into the drain pipe of a receptacle and to be secured therein against displacement in a position to utilize the pressure of the water injected into the pipe, to produce a water tight seal around the plug by expanding the latter so as to positively prevent loss of water pressure, and the ejection of water upwardly into the receptacle.

With these and other objects in view, the invention consists in the combination, arrangement and functional relationship of elements as set forth in the following specification and particularly pointed out in the appended claims.

In the accompanying drawing,

Figure 1 is a view showing partly in side elevation and partly in perspective, the flushing attachment for drains embodying this invention;

Figure 2 is an enlarged fragmentary sectional view showing the plug portion of the invention applied to the drain pipe of a sink;

Figure 3 is a detail perspective view of a connector embodied in the aforestated plug of the invention;

Figure 4 is a fragmentary view in side elevation of a socket for attaching the device to a faucet.

In its present embodiment, the invention comprises a length of flexible hose 10 of rubber or other suitable material, to one end of which is permanently secured an attaching socket 11 of flexible rubber adapted to be forced over the spout of an ordinary water faucet (not shown) to connect the hose with a source of water supply, pump or the like.

To the other end of the hose is permanently secured a plug 12 preferably of elastic rubber, the plug including a disk portion 13 from one side of which projects a collar 14 vulcanized to the hose 10. The bore of the collar 14 extends through the disk portion; and from the periphery of the latter at the opposite side thereof projects an annular flange or skirt 15 which is tapered at 15a so as to reduce in thickness to a feathered free edge 16, thus rendering the skirt readily flexible and expansible.

At the joinder of the disk portion 13 and the flange 15 is an annular recess 17 receiving a disk like body 18 of metal or other rigid material which is confined against displacement by an internal annular lip 19 on the flange 15. The body 18 is provided with an aperture registering with the bore of the collar 14 so as to provide for the unrestricted flow of water from the hose 10 through the plug, and is further provided with connecting members in the form of diametrically opposed hooks 20—20 by which the plug is adapted to be secured against displacement when inserted into the drain of a receptacle such as a sink 21.

The plug is of an external diameter to snugly fit into the usual drain pipe fitting 22 to which the drain pipe 23 is connected, and which fitting is provided with a four-armed spider 24 to prevent the loss of large articles down the drain, as is conventional.

The plug is inserted into the fitting 22 with the hooks 20—20 disposed to pass between the arms of the spider 24 when the flange 15 of the plug is seated upon the arms, so that by slightly rotating the plug in one direction, the transverse portions 25 of the hooks 20 will pass beneath and have hooked engagement with the spider arms, thus firmly securing the plug in closing relation to the inlet of the drain pipe.

It is preferable that in order for the transverse portion 25 of the hooks 20 to pass beneath the spider arms, that the flange 15 be jammed tightly and under stress against the arms so as to function by virtue of its elasticity to aid in securing the plug against displacement.

With the plug thus associated with the drain pipe as is shown in Figure 2, it will be manifest that by opening the faucet to which the hose 10 is connected, a high velocity jet of water at the line pressure will be discharged into the drain pipe so as to loosen any foreign substances therein and flush same through the pipe. As the flexible tapered portion 15a of the flange 15 is exposed to the pressure of the water, the flange will be expanded against the internal wall of the fitting 22 so as to produce a water sealed joint between the plug and fitting, and thereby positively prevent the loss of pressure as well as the ejection of water upwardly into the sink and over the operator. The greater the water pressure, the more tightly will the plug be sealed in the fitting by the expanded flange 15 and be secured against axial displacement by the hooks 20—20.

What is claimed is:

1. A flushing device for drains comprising a conduit adapted for connection to a source of water supply under pressure; a hollow plug on one end of the conduit through which water from the conduit is adapted to flow, the plug having a flexible annular flange and adapted to be inserted into the drain of a sink; and means for detachably securing the plug against displacement from the drain pipe with said flange internally exposed to the pressure of water discharged into the drain pipe so as to cause the flange to be expanded into water sealing engagement with the wall of the drain, said means comprising a rigid body secured in the plug and having hooks adapted for hooked engagement with arms of a spider in the drain, the hooks being so related to the flange of the plug that when the hooks have hooked engagement with the spider arms the flange will be compressed axially against the arms to aid in preventing displacement of the plug.

2. A flushing device for drains comprising a cylindrical soft rubber plug adapted to be manually turned and forced downwardly into a drain toward the spider arms therein and provided with a continuous annular wall tapered vertically to provide a highly flexible lower portion adapted to be expanded into water sealed engagement with the wall of the drain by exposure to the pressure of water discharged into the drain, means by which water under pressure can pass to the drain through said plug; and means carried by the plug for coaction with the arms of the spider upon turning the plug to hold the plug fixed in the drain and in water sealed relation to the walls thereof.

MIGUEL B. ACOSTA.